(12) United States Patent
Nakadate et al.

(10) Patent No.: US 11,694,854 B2
(45) Date of Patent: Jul. 4, 2023

(54) SEPARATOR FOR POWER STORAGE DEVICE AND POWER STORAGE DEVICE

(71) Applicant: SUMITOMO CHEMICAL COMPANY, LIMITED, Tokyo (JP)

(72) Inventors: Junichi Nakadate, Osaka (JP); Takamichi Shinohara, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 507 days.

(21) Appl. No.: 16/762,340

(22) PCT Filed: Nov. 9, 2018

(86) PCT No.: PCT/JP2018/041643
§ 371 (c)(1),
(2) Date: May 7, 2020

(87) PCT Pub. No.: WO2019/093470
PCT Pub. Date: May 16, 2019

(65) Prior Publication Data
US 2020/0381689 A1    Dec. 3, 2020

(30) Foreign Application Priority Data

Nov. 10, 2017 (JP) ................................ 2017-217848
Nov. 10, 2017 (JP) ................................ 2017-217849
(Continued)

(51) Int. Cl.
*H01G 11/52* (2013.01)
*H01M 10/0525* (2010.01)
(Continued)

(52) U.S. Cl.
CPC ........ *H01G 11/52* (2013.01); *H01M 10/0525* (2013.01); *H01M 50/417* (2021.01); *H01M 50/489* (2021.01); *H01M 50/491* (2021.01)

(58) Field of Classification Search
CPC ........... H01M 50/411; H01M 10/0525; H01M 50/489; H01M 50/417; H01M 50/491; H01G 11/52
(Continued)

(56) References Cited

U.S. PATENT DOCUMENTS

2006/0178480 A1   8/2006   Tada et al.
2012/0115008 A1*  5/2012   Sano ................... H01M 50/451
                                                                    429/144
(Continued)

FOREIGN PATENT DOCUMENTS

JP    2009-26499     2/2009
JP    2010-540744   12/2010
(Continued)

OTHER PUBLICATIONS

International Search Report dated Jan. 15, 2019 in International (PCT) Application No. PCT/JP2018/041643.
(Continued)

*Primary Examiner* — Arun Ramaswamy
(74) *Attorney, Agent, or Firm* — Wenderoth, Lind & Ponack, L.L.P.

(57) ABSTRACT

A separator for power storage devices includes a synthetic resin film having minute pore portions, the separator having an air resistance of 30 sec/100 mL/16 μm or more and 100 sec/100 mL/16 μm or less, and a first scattering peak in a stretching direction measured by small-angle X-ray scattering measurement (SAXS) present in a range where a scattering vector is 0.0030 nm$^{-1}$ or more and 0.0080 nm$^{-1}$ or less.

7 Claims, 1 Drawing Sheet

(30) Foreign Application Priority Data

Nov. 10, 2017 (JP) .................................. 2017-217850
Nov. 10, 2017 (JP) .................................. 2017-217851

(51) Int. Cl.
*H01M 50/417* (2021.01)
*H01M 50/489* (2021.01)
*H01M 50/491* (2021.01)

(58) Field of Classification Search
USPC .......................... 429/249; 361/502, 512, 503
See application file for complete search history.

(56) References Cited

U.S. PATENT DOCUMENTS

| | | |
|---|---|---|
| 2013/0288132 A1 | 10/2013 | Terakawa et al. |
| 2013/0316247 A1 | 11/2013 | Kuma et al. |
| 2013/0337311 A1 | 12/2013 | Itou |
| 2016/0079580 A1 | 3/2016 | Sawada |
| 2016/0359157 A1 | 12/2016 | Zhang et al. |
| 2020/0014012 A1 | 1/2020 | Nakadate et al. |
| 2020/0032016 A1 | 1/2020 | Nakadate |

FOREIGN PATENT DOCUMENTS

| | | | |
|---|---|---|---|
| JP | 2011-74367 | 4/2011 | |
| WO | 2004/081109 | 9/2004 | |
| WO | 2012/090632 | 7/2012 | |
| WO | 2012/102241 | 8/2012 | |
| WO | 2012/105661 | 8/2012 | |
| WO | 2014/175252 | 10/2014 | |
| WO | WO-2015182691 A1 * | 12/2015 | ........... B01D 67/002 |
| WO | 2018/147394 | 8/2018 | |
| WO | 2018/147395 | 8/2018 | |

OTHER PUBLICATIONS

Office Action dated Jul. 16, 2019 in corresponding Japanese Application No. 2017-217849, with English translation.
Office Action dated Oct. 8, 2019 in corresponding Japanese Application No. 2017-217850, with English translation.
Office Action dated Jul. 9, 2019 in corresponding Japanese Application No. 2017-217851, with English translation.
Office Action dated Oct. 23, 2019 in corresponding Japanese Application No. 2017-217851, with English translation.
Extended European Search Report dated Oct. 11, 2021 in corresponding European Patent Application No. 18876811.3.

* cited by examiner

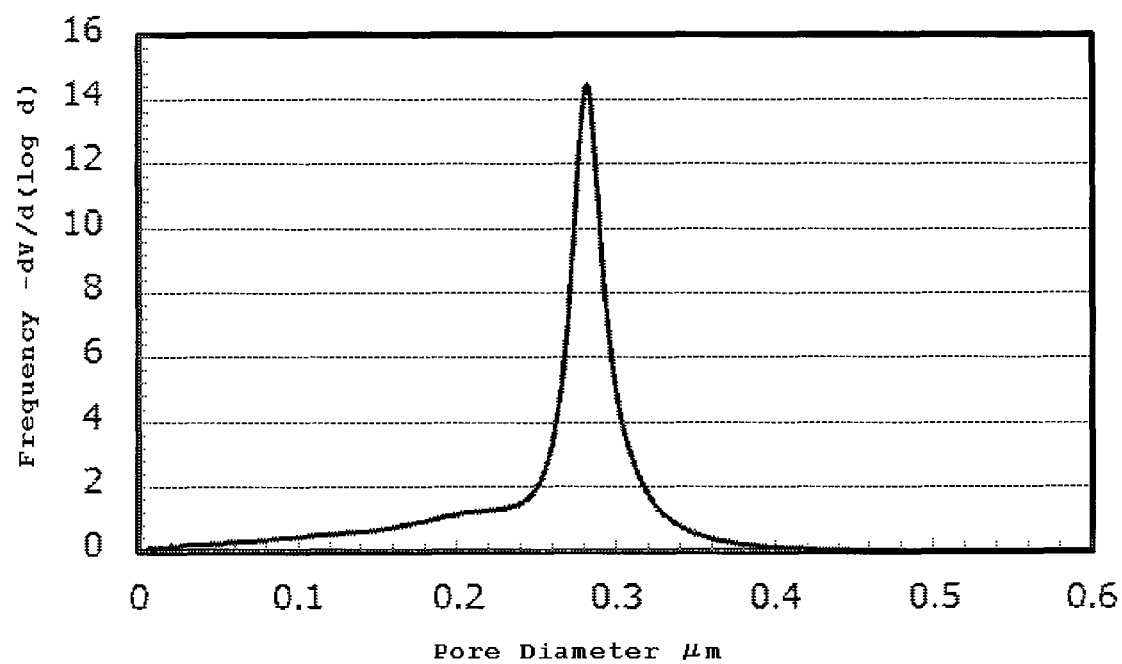

SEPARATOR FOR POWER STORAGE DEVICE AND POWER STORAGE DEVICE

CROSS-REFERENCE TO RELATED APPLICATIONS

The present application claims priority from Japanese Patent Application No. 2017-217848 filed on Nov. 10, 2017, Japanese Patent Application No. 2017-217849 filed on Nov. 10, 2017, Japanese Patent Application No. 2017-217850 filed on Nov. 10, 2017, and Japanese Patent Application No. 2017-217851 filed on Nov. 10, 2017, the disclosures of which are hereby incorporated by reference in their entirety.

TECHNICAL FIELD

The present invention relates to a separator for power storage devices and a power storage device.

BACKGROUND ART

Power storage devices such as lithium ion batteries, capacitors, and condensers are conventionally used. For example, a lithium ion battery generally includes, in an electrolytic solution, a positive electrode, a negative electrode, and a separator. The positive electrode is obtained by applying lithium cobalt oxide or lithium manganese oxide on the surface of an aluminum foil. The negative electrode is obtained by applying carbon on the surface of a copper foil. The separator serves as a partition between the positive electrode and the negative electrode to prevent a short circuit between the positive electrode and the negative electrode.

While a lithium ion battery is charged, lithium ions are released from the positive electrode and enter the negative electrode. On the other hand, while a lithium ion battery is discharged, lithium ions are released from the negative electrode and move to the positive electrode. Such charge and discharge is repeated in a lithium ion battery. Therefore, it is necessary that a separator used in a lithium ion battery allows lithium ions to well permeate there.

Repeated charge and discharge of a lithium ion battery causes the generation of a dendrite (dendritic crystal) of lithium on the edge face of a negative electrode. This dendrite smashes through a separator and causes a minute short circuit (dendrite short circuit) between the positive electrode and the negative electrode.

In recent years, the power of a large-sized battery such as a lithium ion battery for automobiles has been increased, and a decrease in resistance at which lithium ions pass through a separator is required. Therefore, a separator is required to have high gas permeability. Furthermore, it is also important for large-sized lithium ion batteries to reliably have long lifetime and long-term safety.

WO 2012/105661 discloses a porous polypropylene film which includes a polypropylene resin and a β-crystal nucleating agent and whose heat shrinkage temperature at which its size in a width direction shrinks by 5% is 130 to 200° C., air resistance is 50 to 500 sec/100 mL, and porosity is 35 to 70%, wherein the air resistance and the porosity satisfy the following relational expression:

G+15×ε≤1,200

SUMMARY OF INVENTION

Technical Problem

However, the porous polypropylene film disclosed in WO 2012/105661 has low gas permeability and insufficient lithium ion permeability. Therefore, such a polypropylene microporous film is difficult to use for lithium ion batteries required to have high power.

The present invention provides a separator for power storage devices which has excellent permeability of ions such as lithium ions and can constitute power storage devices such as high performance lithium ion batteries, capacitors, and condensers.

Solution to Problem

[Separator for Power Storage Device]

A separator for power storage devices of the present invention includes a synthetic resin film having minute pore portions.

The synthetic resin film is constituted. As the synthetic resin, an olefin-based resin is preferable. An ethylene-based resin and a propylene-based resin are preferable, and a propylene-based resin is more preferable.

The content of the olefin-based resin in the synthetic resin is preferably 50% by mass or more, more preferably 70% by mass or more, particularly preferably 80% by mass or more, and most preferably 100% by mass.

Examples of the propylene-based resin include a homopolypropylene and copolymers of propylene and another olefin. A homopolypropylene is preferable in manufacturing the separator for power storage devices by the stretching method. The propylene-based resin may be used alone or in combination of two or more thereof. The copolymer of propylene and another olefin may be either a block copolymer or a random copolymer. The content of the propylene component in the propylene-based resin is preferably 50% by mass or more, and more preferably 80% by mass or more.

Examples of the olefins copolymerized with propylene include α-olefins such as ethylene, 1-butene, 1-pentene, 4-methyl-1-pentene, 1-hexene, 1-octene, 1-nonene, and 1-decene. Ethylene is preferable.

Examples of the ethylene-based resin include an ultra-low-density polyethylene, a low-density polyethylene, a linear low-density polyethylene, a medium-density polyethylene, a high-density polyethylene, an ultra-high-density polyethylene, and an ethylene-propylene copolymer. Moreover, the ethylene-based resin microporous film may contain another olefin-based resin as long as the film contains an ethylene-based resin. The content of the ethylene component in the ethylene-based resin is preferably more than 50% by mass, and more preferably 80% by mass or more.

The weight-average molecular weight of the olefin-based resin is not particularly limited, and is preferably 30,000 or more and 500,000 or less, and more preferably 50,000 or more and 480,000 or less. The weight-average molecular weight of the propylene-based resin is not particularly limited, and is preferably 250,000 or more and 500,000 or less, and more preferably 280,000 or more and 480,000 or less. The weight-average molecular weight of the ethylene-based resin is not particularly limited, and is preferably 30,000 or more and 250,000 or less, and more preferably 50,000 or more and 200,000 or less. The olefin-based resin having a weight-average molecular weight falling within the aforementioned range can provide a separator for power storage devices having excellent gas permeability.

The molecular weight distribution (weight-average molecular weight Mw/number-average molecular weight Mn) of the olefin-based resin is not particularly limited, and is preferably 5 or more and 30 or less, and more preferably 7.5 or more and 25 or less. The molecular weight distribution of the propylene-based resin is not particularly limited, and is preferably 7.5 or more and 12 or less, and more preferably 8 or more and 11 or less. The molecular weight distribution of the ethylene-based resin is not particularly limited, and is preferably 5.0 or more and 30 or less, and more preferably 8.0 or more and 25 or less. The olefin-based resin having a molecular weight distribution falling within the aforementioned range can provide a separator for power storage devices having excellent gas permeability.

Herein, the weight-average molecular weight and the number-average molecular weight of the olefin-based resin are polystyrene-equivalent values measured by a GPC (gel permeation chromatography) method. Specifically, an olefin-based resin in an amount of 6 mg or more and 7 mg or less is collected, and is supplied to a test tube. Then, an o-DCB (ortho-dichlorobenzene) solution containing 0.05-mass % BHT (dibutylhydroxytoluene) is added into the test tube, thereby diluting the solution to have the olefin-based resin concentration of 1 mg/mL. As a result, a diluted liquid is prepared.

The diluted liquid described above is shaken at 145° C. for 1 hour using a dissolution filtration apparatus at a rotational speed of 25 rpm to dissolve the olefin-based resin in the o-DCB solution to obtain a measurement sample. The weight-average molecular weight and the number-average molecular weight of the olefin-based resin can be measured by the GPC method using this measurement sample.

The weight-average molecular weight and the number-average molecular weight of the olefin-based resin may be measured, for example, with the following measuring device and under the following measuring conditions.

Measuring device: trade name "HLC-8121GPC/HT" manufactured by TOSOH Corporation,
    Measuring Conditions:
        Column: TSKgelGMHHR-H(20)HT×3 TSKguardcolumn-HHR (30) HT×1
        Mobile phase: o-DCB 1.0 mL/min
        Sample concentration: 1 mg/mL
        Detector: Bryce-type refractometer
        Standard substance: Polystyrene (manufactured by TOSOH Corporation, molecular weight: 500 to 8420000)
        Elution conditions: 145° C.
        SEC temperature: 145° C.

The melting point of the olefin-based resin is not particularly limited, and is preferably 130° C. or higher and 170° C. or lower, and more preferably 133° C. or higher and 165° C. or lower. The melting point of the propylene-based resin is not particularly limited, and is preferably 160° C. or higher and 170° C. or lower, and more preferably 160° C. or higher and 165° C. or lower. The melting point of the ethylene-based resin is not particularly limited, and is preferably 130° C. or higher and 140° C. or lower, and more preferably 133° C. or higher and 139° C. or lower. The olefin-based resin having a melting point falling within the aforementioned range can provide a separator for power storage devices having excellent gas permeability.

It is noted that in the present invention, the melting point of the olefin-based resin can be measured according to the following procedure using a differential scanning calorimeter (for example, device name "DSC220C" available from Seiko Instruments Inc. or the like). First, 10 mg of an olefin-based resin is heated from 25° C. to 250° C. at a rate of temperature increase of 10° C./min and held at 250° C. for 3 minutes. Next, the olefin-based resin is cooled from 250° C. to 25° C. at a rate of temperature decrease of 10° C./min and held at 25° C. for 3 minutes. Subsequently, the olefin-based resin is reheated from 25° C. to 250° C. at a rate of temperature increase of 10° C./min, and the temperature at the top of the endothermic peak in this reheating step is taken as the melting point of the olefin-based resin.

The synthetic resin film constituting the separator for power storage devices includes minute pore portions. The minute pore portions preferably extend through the film in the thickness direction thereof. This can impart excellent gas permeability to the separator for power storage devices. Such a separator for power storage devices can transmit ions such as lithium ions in the thickness direction thereof. It is noted that the thickness direction of the separator for power storage devices refers to a direction orthogonal to the main surface of the separator for power storage devices. The main surface of the separator for power storage devices refers to a surface having the largest area among the surfaces of the separator for power storage devices.

In the synthetic resin film of the separator for power storage devices, the minute pore portions are formed preferably by stretching. In a cross section along the thickness direction of the separator for power storage devices, the average pore diameter of the minute pore portions is preferably 20 nm or more and 100 nm or less, more preferably 20 nm or more and 70 nm or less, and particularly preferably 30 nm or more and 50 nm or less.

The average pore diameter of the minute pore portions refers to a value measured according to the following procedure. First, the separator for power storage devices is cut along the thickness direction and the stretching direction (along a surface which is orthogonal to the main surface of the separator for power storage devices and along the stretching direction). An enlarged photograph of the cut surface is taken at a magnification of 10,000 times through a scanning electron microscope (SEM). It is noted that the vertical direction of the enlarged photograph is adjusted to become the thickness direction, and the photographing location is set to the center section in the thickness direction. The entire range of the obtained enlarged photograph is defined as a measurement compartment.

A SEM photograph of the cut surface of the separator for power storage devices is taken according to the following procedure. First, the separator for power storage devices is reinforced with copper tape or the like for facilitating cutting. Thereafter, the separator is cut using a cross section polisher (for example, a cross section polisher commercially available as trade name "IB-19500CP" from JEOL Ltd.). Next, for preventing the distortion of an image due to charge up, a metal film (for example, metal films such as gold, platinum, osmium, and carbon) is deposited on the cut surface. Thereafter, using a SEM (for example, a SEM commercially available as trade name "S-4800S" from Hitachi), the cut surface is photographed under the condition of an accelerating voltage of 1.0 kV. Although the measurement according to the above-described procedure enables a sharp enlarged photograph to be taken, the procedure is not limited to the above-described method, as long as a sharp enlarged photograph can be obtained.

Next, an oval which surrounds a minute pore portion appearing in the enlarged photograph and has the shortest major axis and minor axis is drawn for each minute pore portion. An arithmetic mean value of the length of the major axis and the length of the minor axis of this oval is defined as the pore diameter of the minute pore portion. An arithmetic mean value of the pore diameters of the minute pore portions located within the measurement compartment is defined as the average pore diameter of the minute pore portions. It is noted that only the minute pore portion which is entirely placed within the measurement compartment is to be measured.

The porosity of the separator for power storage devices is preferably 40% or more and 70% or less, more preferably 45% or more and 70% or less, more preferably 45% or more and 65% or less, more preferably 48% or more and 62% or less, more preferably 50% or more and 67% or less, and particularly preferably 53% or more and 60% or less. The separator for power storage devices having a porosity falling within the above-described range has excellent gas permeability.

The porosity of the separator for power storage devices is preferably 45% or more and 65% or less, more preferably 48% or more and 62% or less, and more preferably 50% or more and 58% or less. The separator for power storage devices having a porosity falling within the above-described range has excellent permeability of ions such as lithium ions.

It is noted that the porosity of the separator for power storage devices can be measured according to the following procedure. First, the separator for power storage devices is cut to obtain a test piece having a planar square shape (area 100 cm$^2$) of 10 cm in length×10 cm in width. Next, the weight W (g) and thickness T (cm) of the test piece are measured to calculate an apparent density $\rho$ (g/cm$^3$) as below. It is noted that the thickness of the test piece is measured at 15 locations using a dial gauge (for example, a signal ABS digimatic indicator manufactured by Mitutoyo Corporation) and an arithmetic mean value of the measured values is defined as the thickness of the test piece. Then, this apparent density $\rho$ (g/cm$^3$) and the density $\rho_0$ (g/cm$^3$) of the synthetic resin itself constituting the separator for power storage devices are used to calculate the porosity (%) of the separator for power storage devices according to the following formula.

Apparent density $\rho$ (g/cm$^3$)=$W/(100 \times T)$

Porosity[%]=$100 \times [(\rho_0-\rho)/\rho_0]$

The thickness of the separator for power storage devices is preferably 6 μm or more and 25 μm or less, more preferably 9 μm or more and 20 μm or less, and particularly preferably 12 μm or more and 18 μm or less. The thickness of the separator for power storage devices of 6 μm or more makes it possible to prevent a short circuit between a positive electrode and a negative electrode even when foreign matter enters. The thickness of the separator for power storage devices of 25 μm or less makes it possible to increase the total number of the separators for power storage devices to be stacked, which leads to an increase in battery capacity per unit volume.

It is noted that in the present invention, the thickness of the separator for power storage devices can be measured according to the following procedure. That is, the thickness of the separator for power storage devices is measured at optional 10 locations using a dial gauge, and an arithmetic mean value of the measured values is defined as the thickness of the separator for power storage devices.

The air resistance of the separator for power storage devices is preferably 20 sec/100 mL/16 μm or more and 100 sec/100 mL/16 μm or less, preferably 30 sec/100 mL/16 μm or more and 100 sec/100 mL/16 μm or less, more preferably 30 sec/100 mL/16 μm or more and 80 sec/100 mL/16 μm or less, more preferably 30 sec/100 mL/16 μm or more and 70 sec/100 mL/16 μm or less, and particularly preferably 30 sec/100 mL/16 μm or more and 60 sec/100 mL/16 μm or less. The separator for power storage devices having an air resistance falling within the above-described range has excellent ion permeability.

The air resistance of the separator for power storage devices is preferably 20 sec/100 mL/16 μm or more and 100 sec/100 mL/16 μm or less, more preferably 20 sec/100 mL/16 μm or more and 80 sec/100 mL/16 μm or less, and particularly preferably 20 sec/100 mL/16 μm or more and 70 sec/100 mL/16 μm or less. The air resistance of the separator for power storage devices is most preferably 20 sec/100 mL/16 μm or more and 60 sec/100 mL/16 μm or less. According to the separator for power storage devices having an air resistance falling within the above-described range, a separator for power storage devices having excellent ion permeability can be provided.

It is noted that the air resistance of the separator for power storage devices refers to a value measured according to the following procedure. The gas permeability of the separator for power storage devices is measured at optional 10 locations under the atmosphere of a temperature of 23° C. and a relative humidity of 65% in accordance with JIS P8117. An arithmetic mean value of the measured values is calculated. The calculated arithmetic mean value is divided by the thickness of the separator for power storage devices and standardized to be per 16 μm thickness. The thus determined value is defined as an air resistance (sec/100 mL/16 μm).

The separator for power storage devices is preferably uniaxially stretched. When the separator for power storage devices is uniaxially stretched, stretching stress applied during uniaxial stretching slightly remains in the separator for power storage devices as residual stress. Therefore, when the temperature in a power storage device abnormally rises, the separator for power storage devices slightly deforms due to the residual stress to the extent that a short circuit does not occur between a positive electrode and a negative electrode to actively bend the minute pore portions extending in the thickness direction of the separator for power storage devices so that ion permeability is reduced. As a result, an abnormal reaction in the power storage device is inhibited, which makes it possible to reduce the abnormally high temperature in the power storage device and improve safety.

The present inventors have intensively studied the relationship between a first scattering peak in the stretching direction measured by small-angle X-ray scattering measurement (SAXS) and a scattering vector q. As a result of the study, the present inventors have found that when, in a graph where the horizontal axis represents a scattering vector q (nm$^{-1}$) and the vertical axis represents a scattering intensity (a.u.), the scattering intensity has a first scattering peak in a range where the scattering vector q is 0.0030 nm$^{-1}$ or more and 0.0080 nm$^{-1}$ or less, the separator for power storage devices has the following advantage. That is, the present inventors have found that the minute pore portions of the separator for power storage devices are formed so as to linearly extend in the thickness direction of the separator for power storage devices while being prevented from meandering and bending to the extent possible, which makes it possible to impart excellent gas permeability to the separator for power storage devices.

The first scattering peak in the stretching direction measured by small-angle X-ray scattering measurement (SAXS) is preferably present in a range where the scattering vector q is 0.0030 nm$^{-1}$ or more and 0.0080 nm$^{-1}$ or less. More preferably, the first scattering peak in the stretching direction measured by small-angle X-ray scattering measurement (SAXS) is present in a range where the scattering vector q is 0.0040 nm$^{-1}$ or more and 0.0080 nm$^{-1}$ or less. Even more preferably, the first scattering peak in the stretching direction measured by small-angle X-ray scattering measurement (SAXS) is present in a range where the scattering vector q is 0.0050 nm$^{-1}$ or more and 0.0080 nm$^{-1}$ or less. Particularly preferably, the first scattering peak in the stretching direction measured by small-angle X-ray scattering measurement (SAXS) is present in a range where the scattering vector q is 0.0060 nm$^{-1}$ or more and 0.0080 nm$^{-1}$ or less. When the first scattering peak q is present in a range of 0.0030 nm$^{-1}$ or more, the separator for power storage devices has improved permeability of ions such as lithium ions. When the first scattering peak q is present in a range of 0.0080 nm$^{-1}$ or less, the minute pore portions of the separator for power storage devices are uniformly formed, which makes it possible to substantially prevent the generation of a dendrite.

Small-angle X-ray scattering measurement (SAXS) is a measurement method in which the separator for power storage devices is irradiated with X-rays, and scattered X-rays appearing in a small angle region of 2θ<10° are measured to measure the ordered structure of the separator for power storage devices at the several nanometer level. The scattering vector q is represented as $4\pi \sin \theta/\lambda$. It is noted that λ is the wavelength of X-rays that enter the separator for power storage devices, and 2θ is a scattering angle.

In a lamellar structure formed in the separator for power storage devices, in which amorphous portions and crystalline portions are laid on top of each other, the minute pore portions are formed by stretching the amorphous portions. More specifically, in the separator for power storage devices, lamellar crystalline portions are arranged in parallel with each other at prescribed intervals, and amorphous portions present between the crystalline portions are partially stretched. By stretching, voids are continuously generated in the thickness direction of the separator for power storage devices, thereby forming the minute pore portions.

In the small-angle X-ray scattering measurement (SAXS) of the separator for power storage devices, the present inventors have found a phenomenon in which a scattering peak appears when an ordered structure is present, and a phenomenon in which θ increases when the distance between adjacent crystalline portions increases.

That is, the present inventors have found that when the first scattering peak in the stretching direction (the arrangement direction of the lamellar crystalline portions) is present in a range where the scattering vector q is 0.0030 nm$^{-1}$ or more and 0.0080 nm$^{-1}$ or less, the crystalline portions are arranged in parallel with each other at appropriate intervals. Further, the present inventors have found that between the crystalline portions arranged in parallel with each other, the minute pore portions are formed while substantially being prevented from meandering and bending in the thickness direction of the separator for power storage devices.

Therefore, in the separator for power storage devices, the minute pore portions having an appropriate size are formed in the thickness direction of the separator for power storage devices while substantially being prevented from meandering and bending in the thickness direction, which allows the separator for power storage devices to have excellent permeability of ions and the like.

Further, in the separator for power storage devices, the minute pore portions can almost uniformly be formed between the lamellar crystalline portions, which makes it possible to achieve uniform lithium ion permeability, substantially prevent the generation of a dendrite, and improve the long lifetime and long-term safety of a power storage device using the separator for power storage devices.

Further, the lamellar crystalline portions are regularly arranged in parallel with each other, and between the lamellar crystalline portions, the minute pore portions are roughly linearly formed while substantially being prevented from meandering and bending in the thickness direction of the separator for power storage devices. Therefore, the lamellar crystalline portions can have a sufficient thickness while the minute pore portions are sufficiently formed, which allows the separator for power storage devices to have excellent mechanical strength.

The present inventors have also intensively studied a long period measured by small-angle X-ray scattering measurement (SAXS). As a result of the study, the present inventors have found that when the lamellar long period is preferably less than 27 nm, the separator for power storage devices has the following advantage. That is, the present inventors have found that the minute pore portions of the separator for power storage devices are formed so as to linearly extend in the thickness direction of the separator for power storage devices while being prevented from meandering and bending to the extent possible, which makes it possible to impart excellent gas permeability to the separator for power storage devices.

The lamellar long period measured by small-angle X-ray scattering measurement (SAXS) is preferably less than 27 nm, more preferably 20 nm or more and less than 27 nm, even more preferably 21 nm or more and less than 27 nm, even more preferably 22 nm or more and 26 nm or less, and particularly preferably 23 nm or more and 26 nm or less. The lamellar long period of less than 27 nm prevents thermal shrinkage of the separator for power storage devices, which allows the separator for power storage devices to have excellent heat resistance. The lamellar long period of 20 nm or more allows the separator for power storage devices to have excellent permeability of ions and the like.

In a lamellar structure formed in the separator for power storage devices, in which amorphous portions and crystalline portions are laid on top of each other, the minute pore portions are formed by stretching the amorphous portions. More specifically, in the separator for power storage devices, lamellar crystalline portions are arranged in parallel with each other at prescribed intervals, and amorphous portions are present between the crystalline portions. The amorphous portions are partially stretched so that openings are continuously formed in the thickness direction of the separator for power storage devices, thereby forming the minute pore portions.

The present inventors have also found that when the long period measured by small-angle X-ray scattering measurement (SAXS) falls within a prescribed range, the lamellar crystalline portions are arranged in parallel with each other at appropriate intervals, and thus, residual stress generated in the amorphous portions between the crystalline portions is small, and minute pores are formed so as to extend in the thickness direction.

That is, the present inventors have found that when the long period measured by small-angle X-ray scattering measurement (SAXS) is preferably less than 27 nm, the crystalline portions are arranged in parallel with each other at appropriate intervals, and that between the crystalline portions arranged in parallel with each other, the minute pore portions are formed while substantially being prevented from meandering and bending in the thickness direction of the separator for power storage devices.

Therefore, in the separator for power storage devices, the minute pore portions having an appropriate size are formed in the thickness direction of the separator for power storage devices while substantially being prevented from meandering and bending in the thickness direction, which allows the separator for power storage devices to have excellent permeability of ions and the like.

Further, in the separator for power storage devices, the minute pore portions can almost uniformly be formed between the lamellar crystalline portions, which makes it possible to achieve uniform lithium ion permeability, substantially prevent the generation of a dendrite, and improve the long lifetime and long-term safety of a power storage device using the separator for power storage devices.

Further, the lamellar crystalline portions are regularly arranged in parallel with each other, and between the lamellar crystalline portions, the minute pore portions are roughly linearly formed while substantially being prevented from meandering and bending in the thickness direction of the separator for power storage devices. Therefore, the lamellar crystalline portions can have a sufficient thickness while the minute pore portions are sufficiently formed, which allows the separator for power storage devices to have excellent mechanical strength.

In the present invention, the small-angle X-ray scattering measurement (SAXS) measurement is performed according to the following procedure. The small-angle X-ray scattering measurement (SAXS) is performed according to the following procedure using an X-ray diffractometer. First, 8 test pieces each having a regular square shape in a plane view with a side 30 mm are cut out from the separator for power storage devices. It is noted that any one of the edges of the test piece is adjusted to correspond to the stretching direction. The obtained 8 test pieces are stacked in the thickness direction to prepare a test sample. The test sample is set in a measuring tool, and X-rays are allowed to enter the test sample. The irradiation direction of X-ray is adjusted so as to be orthogonal to the planar direction of the test pieces constituting the test sample. It is noted that the X-ray diffractometer to be used may be, for example, a device commercially available from Rigaku Corporation under the trade name of "X-ray diffractometer SmartLab."

As a light source, Cu-Kα rays (wavelength: 0.154 nm) are used at an output of 45 kV and 200 mA, and high resolution PB-Ge(220)×2 arrangement is used. The measurement is performed in a scan range of 0° or more and 0.5° or less with a step of 0.0006° at a scan rate of 0.02°/min.

When the stretching direction is defined as a y axis, a direction orthogonal to the stretching direction is defined as an x axis, the scattering vector q in the stretching direction is plotted on a horizontal axis, and the scattering intensity is plotted on a vertical axis, a scattering peak appearing on the most low-angle side, that is, on the low qy side is defined as a first scattering peak in the stretching direction.

A scattering vector qy of a lamellar structure-derived scattering peak, which is observed in a range where the scattering vector q in the stretching direction is 0.2 nm$^{-1}$ or more and 0.35 nm$^{-1}$ or less at the time when the stretching direction is defined as the y axis and a direction orthogonal to the stretching direction is defined as the x axis, is read, and a lamellar long period d is calculated according to the following formula.

Lamellar long period $d = 2\pi/qy$

Further, the present inventors have intensively studied the relationship between a bubble point pore diameter rBP measured by a bubble point method and an average flow diameter rAVE measured by a bubble point method. As a result, the present inventors have found that when the bubble point rBP and the average flow diameter rAVE satisfy a relationship represented by the following formula (1), the minute pore portions are formed so as to linearly extend in the thickness direction of the separator for power storage devices while being prevented from meandering and bending to the extent possible, which makes it possible to impart excellent gas permeability to the separator for power storage devices.

More specifically, the separator for power storage devices preferably satisfies the following formula (1) representing a relationship between the bubble point pore diameter rBP measured by a bubble point method and the average flow diameter rAVE measured by a bubble point method:

$$100\times(rBP-rAVE)/rAVE < 40 \qquad \text{Formula (1).}$$

The separator for power storage devices preferably satisfies the following formula (2):

$$100\times(rBP-rAVE)/rAVE < 35 \qquad \text{Formula (2).}$$

The separator for power storage devices preferably satisfies the following formula (3):

$$100\times(rBP-rAVE)/rAVE < 30 \qquad \text{Formula (3).}$$

The separator for power storage devices satisfying the above-described formula (1) has the minute pore portions being almost uniformly formed in the thickness direction of the separator for power storage devices, which makes it possible to improve the gas permeability of the separator for power storage devices.

Further, the minute pore portions in the separator for power storage devices can almost uniformly be formed, which makes it possible to achieve uniform permeability of ions such as lithium ions, substantially prevent the generation of a dendrite, and improve the long lifetime and long-term safety of a power storage device using the separator for power storage devices.

It is noted that the bubble point rBP and the average flow diameter rAVE of the separator for power storage devices refer to values measured by a bubble point method according to the following procedure. More specifically, the bubble point rBP and the average flow diameter rAVE can be measured according to the following procedure using a specific surface area and pore diameter analyzer. First, measurement was performed according to a bubble point method conforming to JIS K 3832 (1990) and a half-dry method conforming to ASTM E1294-89 (1999). A test piece having a regular hexagonal shape in a plane view with a side 50 mm is cut out from the separator for power storage devices. A fluorine-based inert liquid is used as a liquid with which a test piece for drawing a wet flow curve by a half-dry method is impregnated. The sample impregnated with the liquid is used to measure the bubble point rBP and the average flow diameter rAVE with a specific surface area and pore diameter analyzer. It is noted that the specific surface area and pore diameter analyzer to be used may be, for example, a device commercially available from Porous Materials, Inc. under the trade name of "Perm-Porometer (CFP-1200A)." As the fluorine-based inert liquid with which a test piece for drawing a wet flow curve by a half-dry method is impregnated, for example, a liquid commercially available from 3M under the trade name of "Fluorinert FC-40 (surface tension: 16 dynes/cm)" may be used.

The measurement will more specifically be described with reference to a case where a device commercially available from Porous Materials, Inc. under the trade name of "Perm- Porometer (CFP-1200A)" is used as the specific surface area and pore diameter analyzer. First, a test piece having a regular hexagonal shape in a plane view with a side 50 mm is cut out from the separator for power storage devices. The test piece for drawing a wet flow curve by a half-dry method is entirely impregnated with a liquid commercially available from 3M under the trade name of "Fluorinert FC-40 (surface tension: 16 dynes/cm)." In a chamber with an O-ring (inner diameter: 14 mm, outer diameter: 26 mm) recommended by Porous Materials, Inc., the test piece is placed in such a manner that air is not caught therebetween, and then a cylinder with the same O-ring as described above is provided on the test piece so that the test piece is interposed between the chamber and the cylinder. Then, a chamber cap is tightened to place the test piece in a prescribed position. A wet test and a dry test are performed using the same test piece in wet-up/dry-up measurement mode. Measurement parameters take default values except that a bubble flow is set to 10 cc/min and a bubble time is set to 200. The estimated bubble point pressure is 0 (atmospheric pressure). The bubble point rBP and the average flow diameter rAVE are each measured three times by changing the test piece. An arithmetic mean value of measured values of the bubble point rBP is defined as the bubble point rBP of the separator for power storage devices, and an arithmetic mean value of measured values of the average flow diameter rAVE is defined as the average flow diameter rAVE of the separator for power storage devices.

The bubble point pore diameter rBP is preferably 0.01 µm or more and 0.1 µm or less, more preferably 0.02 µm or more and 0.08 µm or less, and particularly preferably 0.02 µm or more and 0.07 µm or less. The bubble point pore diameter rBP of 0.01 µm or more improves the permeability of ions such as lithium ions. The bubble point pore diameter rBP of 0.1 µm or less makes it possible to substantially prevent the generation of a dendrite.

The specific surface area of the separator for power storage devices is preferably 20 $m^2/g$ or more and 60 $m^2/g$ or less, more preferably 20 $m^2/g$ or more and 55 $m^2/g$ or less, and particularly preferably 20 $m^2/g$ or more and 50 $m^2/g$ or less. The specific surface area of 20 $m^2/g$ or more improves the ion permeability of the separator for power storage devices. The specific surface area of 60 $m^2/g$ or less improves the electrolytic solution impregnability of the separator for power storage devices.

That is, the separator for power storage devices having a porosity of 45% or more and 65% or less contains a sufficient amount of the synthetic resin, and therefore has excellent mechanical strength and reliably separates a positive electrode and a negative electrode from each other, so that a short circuit between the positive electrode and the negative electrode can reliably be prevented.

Further, when the separator for power storage devices has the specific surface area of 20 $m^2/g$ or more and 60 $m^2/g$ or less, the minute pore portions of the separator for power storage devices are formed so as to linearly extend in the thickness direction of the separator for power storage devices while being prevented from meandering and bending to the extent possible, which makes it possible to impart excellent gas permeability to the separator for power storage devices. Further, since the minute pore portions of the separator for power storage devices are formed so as to linearly extend in the thickness direction of the separator for power storage devices, the separator for power storage devices has excellent electrolytic solution impregnability, which makes it possible to complete the step of impregnation with an electrolytic solution in a short period of time.

It is noted that the specific surface area of the separator for power storage devices is measured according to the following procedure. The specific surface area of the separator for power storage devices can be measured according to the following procedure using a specific surface area and pore size analyzer. First, the separator for power storage devices is cut into a strip shape and placed in a measuring cell [large cell 5.0 $cm^3$ (stem outer diameter: 9 mm)], and the measuring cell is subjected to vacuum deaeration at room temperature (25° C.) for 1 hour. Nitrogen gas is used as an adsorption gas, and measurement is performed at several points on the adsorption side in the range of $P/P_0=0$ to 0.3. It is noted that as the specific surface area and pore size analyzer, for example, a device commercially available from Quantachrome under the trade name of "QUADRASORB evo" may be used.

Analysis is performed according to a multipoint method conforming to JIS Z8830 to calculate the specific surface area of the separator for power storage devices. Two samples are prepared, and the specific surface area of each of the samples is measured. An arithmetic mean value of the specific surface areas is defined as the specific surface area of the separator for power storage devices.

The maximum pore diameter of the separator for power storage devices is preferably 0.2 µm or more and 0.4 µm or less, and more preferably 0.2 µm or more and 0.3 µm or less. The maximum pore diameter of 0.2 µm or more improves the permeability of ions, such as lithium ions, of the separator for power storage devices. The maximum pore diameter of 0.4 µm or less improves electrolytic solution impregnability.

It is noted that the maximum pore diameter of the separator for power storage devices refers to a value measured according to the following procedure. The maximum pore diameter of the separator for power storage devices can be measured according to the following procedure using a full automatic pore size distribution measuring device. First, the separator for power storage devices was cut into a strip shape to prepare a test piece. The test piece weighing about 0.3 g was packed into a sample cell [small cell (10ϕ×30 mm, stem capacity: 0.5 $cm^3$)]. A pore size distribution curve was measured under measuring conditions of a pore diameter of 0.0065 µm or more and 10 µm or less, a mercury contact angle of 140°, and a mercury surface tension of 480 dyn/cm (for example, FIG. 1). From the obtained pore size distribution curve, a pore diameter such that the amount of mercury intruded (amount of change) was maximum (the frequency was maximum) was determined, and such a pore diameter was defined as a maximum pore diameter. It is noted that the full automatic pore size distribution measuring device may be, for example, a device commercially available from Quantachrome under the trade name of "Pore Master 60-GT."

The synthetic resin constituting the separator for power storage devices preferably satisfies any one of the above-mentioned preferable physical properties (such as type, weight-average molecular weight, molecular weight distribution, and melting point). The synthetic resin constituting the separator for power storage devices may satisfy two or more physical properties out of the above-mentioned preferable physical properties (such as type, weight-average molecular weight, molecular weight distribution, and melting point).

The separator for power storage devices preferably satisfies any one of the configurations (1) to (4) described below.

The separator for power storage devices may satisfy two or more configurations out of the configurations (1) to (4) described below.

(1) The air resistance is 30 sec/100 mL/16 μm or more and 100 sec/100 mL/16 μm or less; and the first scattering peak thereof in a stretching direction measured by small-angle X-ray scattering measurement (SAXS) is present in a range where the scattering vector q is 0.0030 nm$^{-1}$ or more and 0.0080 nm$^{-1}$ or less.

(2) The air resistance is 30 sec/100 mL/16 μm or more and 100 sec/100 mL/16 μm or less; and the lamellar long period thereof measured by small-angle X-ray scattering measurement (SAXS) is less than 27 nm.

(3) The separator is uniaxially stretched and the bubble point pore diameter rBP and average flow diameter rAVE thereof measured by a bubble point method satisfy the formula (1).

(4) The porosity is 45% or more and 65% or less, and the specific surface area is 20 m$^2$/g or more and 60 m$^2$/g or less.

That is, it is preferred that the separator for power storage devices includes a synthetic resin film having minute pore portions and has the air resistance of 30 sec/100 mL/16 μm or more and 100 sec/100 mL/16 μm or less, and the first scattering peak thereof in a stretching direction measured by small-angle X-ray scattering measurement (SAXS) present in a range where the scattering vector q is 0.0030 nm$^{-1}$ or more and 0.0080 nm$^{-1}$ or less.

It is preferred that the separator for power storage devices includes a synthetic resin film having minute pore portions and has the air resistance of 30 sec/100 mL/16 μm or more and 100 sec/100 mL/16 μm or less, and the lamellar long period thereof measured by small-angle X-ray scattering measurement (SAXS) of less than 27 nm.

It is preferred that the separator for power storage devices includes a synthetic resin film having minute pore portions and is uniaxially stretched, and that the bubble point pore diameter rBP and average flow diameter rAVE thereof measured by a bubble point method satisfy the formula (1):

$$100 \times (rBP - rAVE)/rAVE < 40 \quad \text{Formula (1).}$$

It is preferred that the separator for power storage devices includes a synthetic resin film having minute pore portions, and has an air resistance of 30 sec/100 mL/16 μm or more and 100 sec/100 mL/16 μm or less, a porosity of 45% or more and 65% or less, and a specific surface area of 20 m$^2$/g or more and 60 m$^2$/g or less.

As described above, the separator for power storage devices has excellent gas permeability and can substantially prevent the generation of a dendrite. Therefore, the separator for power storage devices can suitably be used as a separator for power storage devices required to have high power (such as lithium ion batteries, nickel hydrogen batteries, nickel cadmium batteries, nickel zinc batteries, silver zinc batteries, capacitors (electric double layer capacitors, lithium ion capacitors), and condensers).

[Manufacturing Method of Separator for Power Storage Device]

The manufacturing method of the separator for power storage devices will be described.

The separator for power storage devices can be manufactured by a method including the following steps:

an extrusion step of supplying a synthetic resin into an extruder for melting and kneading, and extruding the melted and kneaded synthetic resin from a T die attached to the tip of the extruder to obtain a synthetic resin film;

an aging step of aging the synthetic resin film obtained in the extrusion step for 1 minute or more such that the surface temperature thereof becomes (melting point of synthetic resin−30° C.) to (melting point of synthetic resin−1° C.)

a stretching step of uniaxially stretching the synthetic resin film after the aging step at a strain rate of 10%/min or more and 250%/min or less and a stretch ratio of 1.5 times or more and 2.8 times or less; and an annealing step of annealing the synthetic resin film after the stretching step.

Hereinafter, the manufacturing method of the separator for power storage devices will be sequentially described.

(Extrusion Step)

First, the extrusion step of supplying a synthetic resin into an extruder for melting and kneading, and extruding the melted and kneaded synthetic resin from the T die attached to the tip of the extruder to obtain a synthetic resin film is performed.

The temperature of the synthetic resin when the synthetic resin is melted and kneaded by the extruder is preferably (melting point of synthetic resin+20° C.) to (melting point of synthetic resin+100° C.), and more preferably (melting point of synthetic resin+25° C.) to (melting point of synthetic resin+80° C.). The temperature of the synthetic resin falling within the above-described range can improve the orientation properties of the synthetic resin and highly form lamellae of the synthetic resin.

The draw ratio when the synthetic resin is extruded from the extruder into a film shape is preferably 50 or more and 300 or less, more preferably 55 or more and 280 or less, particularly preferably 65 or more and 250 or less, and most preferably 68 or more and 250 or less. The draw ratio of 50 or more can sufficiently orient molecules of the synthetic resin, so that lamellae of the synthetic resin can be sufficiently generated. The draw ratio of 300 or less can improve the film formation stability of the synthetic resin film, and improve the thickness accuracy and width accuracy of the synthetic resin film.

It is noted that the draw ratio refers to a value obtained by dividing the clearance of the lip of the T die by the thickness of the synthetic resin film extruded from the T die. The clearance of the lip of the T die can be obtained by measuring the clearance of the lip of the T die at 10 or more locations using a feeler gauge (for example, a JIS feeler gauge manufactured by Nagai Gauge Seisakusho) in accordance with JIS B7524, and calculating an arithmetic mean value of the measured values. The thickness of the synthetic resin film extruded from the T die can be obtained by measuring the thickness of the synthetic resin film extruded from the T die at 10 or more locations using a dial gauge (for example, a signal ABS digimatic indicator manufactured by Mitutoyo Corporation), and calculating an arithmetic mean value of the measured values.

The film forming rate of the synthetic resin film is preferably 10 m/min or more and 300 m/min or less, more preferably 15 m/min or more and 250 m/min or less, and particularly preferably 15 m/min or more and 30 m/min or less. The film forming rate of the synthetic resin film being 10 m/min or more can sufficiently orient molecules of the synthetic resin, so that lamellae of the synthetic resin can be sufficiently generated. Also, the film forming rate of the synthetic resin film being 300 m/min or less can improve the film formation stability of the synthetic resin film, and improve the thickness accuracy and width accuracy of the synthetic resin film.

The synthetic resin film extruded from the T die is preferably cooled until the surface temperature thereof becomes equal to or lower than (melting point of synthetic resin−100° C.). This can promote the crystallization of the synthetic resin and the generation of lamellae. By extruding the melted and kneaded synthetic resin to orient previously synthetic resin molecules which constitute the synthetic resin film, and then cooling the synthetic resin film, the generation of lamellae can be promoted in a portion where the synthetic resin is oriented.

The surface temperature of the cooled synthetic resin film is preferably equal to or lower than (melting point of synthetic resin–100° C.), more preferably (melting point of synthetic resin–140° C.) to (melting point of synthetic resin–110° C.), and particularly preferably (melting point of synthetic resin–135° C.) to (melting point of synthetic resin–120° C.) The surface temperature of the cooled synthetic resin film being equal to or lower than (melting point of synthetic resin–100° C.) can sufficiently generate lamellae of the synthetic resin constituting the synthetic resin film.

(Aging Step)

Next, the synthetic resin film obtained by the above-described extrusion step is aged. This aging step of the synthetic resin film is performed for growing the lamellae generated in the synthetic resin film during the extrusion step. This can form a laminated lamellae structure in which crystallized portions (lamellae) and amorphous portions are alternately arranged in the extrusion direction of the synthetic resin film. In the later-described stretching step of the synthetic resin film, a crack is caused to occur not in the lamella but between the lamellae (amorphous portions). Furthermore, starting from this crack, a minute through hole (minute pore portion) can be formed.

The aging temperature of the synthetic resin film is preferably (melting point of synthetic resin–30° C.) to (melting point of synthetic resin–1° C.), and more preferably (melting point of synthetic resin–25° C.) to (melting point of synthetic resin–5° C.). The aging temperature of the synthetic resin film being equal to or higher than (melting point of synthetic resin–30° C.) can sufficiently orient molecules of the synthetic resin and sufficiently grow lamellae. Also, the aging temperature of the synthetic resin film being equal to or lower than (melting point of synthetic resin–1° C.) can sufficiently orient molecules of the synthetic resin film and sufficiently grow lamellae. It is noted that the aging temperature of the synthetic resin film refers to the surface temperature of the synthetic resin film.

The aging time of the synthetic resin film is preferably 1 minute or more, more preferably 3 minutes or more, particularly preferably 5 minutes or more, and most preferably 10 minutes or more. The aging of the synthetic resin film performed for 1 minute or more can sufficiently and uniformly grow lamellae of the synthetic resin film. The excessively long aging time may cause the synthetic resin film to be thermally deteriorated. Therefore, the aging time is preferably 30 minutes or less, and more preferably 20 minutes or less.

(Stretching Step)

Next, the stretching step of uniaxially stretching the synthetic resin film after the aging step is performed. In the stretching step, the synthetic resin film is preferably uniaxially stretched only in the extrusion direction.

The stretching method of the synthetic resin film in the stretching step is not particularly limited as long as the synthetic resin film can be uniaxially stretched. An example thereof may include a method of uniaxially stretching the synthetic resin film at a prescribed temperature using a uniaxially stretching apparatus. The stretching of the synthetic resin film is preferably performed by sequential stretching of performing stretching multiple times in a divided manner. The sequential stretching can lower the air resistance while suppressing the porosity of the obtain separator for power storage devices low.

The strain rate when the synthetic resin film is stretched is preferably 10%/min or more and 250%/min or less, more preferably 30%/min or more and 245%/min or less, and particularly preferably 35%/min or more and 240%/min or less. When the strain rate during the stretching of the synthetic resin film is adjusted to fall within the above-described range, a crack is not irregularly generated between lamellae, but is regularly generated between lamellae which are arranged at prescribed intervals in the stretching direction of the synthetic resin film and which are placed on an imaginary line extending in the thickness direction of the synthetic resin film. Therefore, the separator for power storage devices includes support portions (lamellar crystalline portions) extending roughly in the thickness direction and minute pore portions continuously and linearly formed in the thickness direction to the extent possible. The strain rate when the synthetic resin film is stretched refers to a value calculated according to the following formula. It is noted that the strain rate refers to a deformation strain per unit time ε [%/min], which is calculated on the basis of a stretch ratio λ [%], a line conveying rate V [m/min], and a stretch section length F [m]. The line conveying rate V refers to a conveying rate of the synthetic resin film at the entrance of the stretch section. The stretch section length F refers to a conveying distance from the entrance to the exit of the stretch section.

$$\text{Strain rate } \varepsilon = \lambda \times V/F$$

In the stretching step, the surface temperature of the synthetic resin film is preferably (melting point of synthetic resin–100° C.) to (melting point of synthetic resin–5° C.), and more preferably (melting point of synthetic resin–30° C.) to (melting point of synthetic resin–10° C.). The surface temperature falling within the above-described range can smoothly generate a crack in an amorphous portion between lamellae and produce a minute pore portion, without breaking the synthetic resin film.

In the stretching step, the stretch ratio of the synthetic resin film is preferably 1.5 times or more and 3.0 times or less, more preferably 2.0 times or more and 2.9 times or less, and particularly preferably 2.3 times or more and 2.8 times or less. The stretch ratio falling within the above-described range can uniformly form the minute pore portions in the synthetic resin film.

It is noted that the stretch ratio of the synthetic resin film refers to a value obtained by dividing the length of the synthetic resin film after stretching by the length of the synthetic resin film before stretching.

(Annealing Step)

Next, the annealing step of performing an annealing treatment onto the synthetic resin film after the stretching step is performed. This annealing step is performed for relieving the residual strain generated in the synthetic resin film due to the stretch applied in the above-described stretching step to prevent the obtained separator for power storage devices from being thermally shrunk by heating.

The surface temperature of the synthetic resin film in the annealing step is preferably (melting point of synthetic resin–40° C.) to (melting point of synthetic resin–5° C.). The surface temperature of (melting point of synthetic resin–40° C.) or more allows residual stress to remain in the synthetic resin film to the extent that shrinkage occurs to prevent a short circuit between a positive electrode and a negative electrode at an abnormally high temperature so that the minute pore portions are bent at an abnormally high temperature due to the occurrence of slight shrinkage to suppress the permeability of ions and the like to effectively reduce the abnormally high temperature. The surface temperature of (melting point of synthetic resin−5° C.) or less can prevent the blockage of the minute pore portions formed in the stretching step.

The shrinkage rate of the synthetic resin film in the annealing step is preferably 30% or less. The shrinkage rate of 30% or less allows residual stress to remain in the synthetic resin film to the extent that shrinkage occurs to prevent a short circuit between a positive electrode and a negative electrode at an abnormally high temperature so that the minute pore portions are bent at an abnormally high temperature due to the occurrence of slight shrinkage to suppress the permeability of ions and the like to effectively reduce the abnormally high temperature, or allows the minute pore portions to maintain their shapes.

It is noted that the shrinkage rate of the synthetic resin film refers to a value obtained by dividing the shrinkage length of the synthetic resin film in the stretching direction during the annealing step by the length of the synthetic resin film in the stretching direction after the stretching step, and multiplying the calculated value by 100.

The stretching step and the annealing step subsequent to the stretching step may be repeated two or more times. When the stretching step and the annealing step are repeated two or more times, the same conditions as described above can be used.

Advantageous Effects of Invention

The separator for power storage devices of the present invention has excellent permeability of ions such as lithium ions, and can constitute power storage devices such as high-performance lithium ion batteries, capacitors, and condensers.

The separator for power storage devices of the present invention having a first scattering peak in a stretching direction measured by small-angle X-ray scattering measurement (SAXS) in a range where the scattering vector q is 0.0030 nm$^{-1}$ or more and 0.0080 nm$^{-1}$ or less is less likely to cause a short circuit between a positive electrode and a negative electrode as well as a rapid decrease in discharge capacity due to a dendrite even when used in high power applications.

The separator for power storage devices of the present invention having a lamellar long period of less than 27 nm measured by small-angle X-ray scattering measurement (SAXS) has also excellent heat resistance.

The separator for power storage devices of the present invention whose bubble point pore diameter rBP and average flow diameter rAVE measured by a bubble point method satisfy the formula (1) is less likely to cause a short circuit between a positive electrode and a negative electrode as well as a rapid decrease in discharge capacity due to a dendrite even when used in high power applications.

The separator for power storage devices of the present invention having a porosity of 45% or more and 65% or less and a specific surface area of 20 m$^2$/g or more and 60 m$^2$/g or less has also excellent electrolytic solution impregnability. Therefore, the separator for power storage devices can be impregnated with a necessary amount of an electrolytic solution in a short period of time, which makes it possible to improve the efficiency of manufacturing batteries.

BRIEF DESCRIPTION OF DRAWINGS

FIG. 1 is a graph showing an example of a pore diameter distribution curve measured in the measurement of a maximum pore diameter.

DESCRIPTION OF EMBODIMENTS

Although examples of the present invention will be described below, the present invention is not limited by these examples.

EXAMPLES

Examples 1 to 5, Comparative Examples 1 and 2

(Extrusion Step)

A homopolypropylene having a weight-average molecular weight Mw, number-averaged molecular weight Mn, molecular weight distribution (Mw/Mn), and melting point indicated in Table 1 was supplied into an extruder, melted and kneaded at a resin temperature indicated in Table 1, and extruded from a T die attached to the tip of the extruder into a film shape. Thereafter, the film was cooled until the surface temperature thereof became 30° C. to obtain a long-length homopolypropylene film having a thickness of 18 μm and a width of 200 mm. It is noted that the film forming rate, extrusion amount, and draw ratio were as indicated in Table 1.

(Aging Step)

Next, the homopolypropylene film was aged for a time (aging time) indicated in Table 1 such that the surface temperature thereof became an aging temperature indicated in Table 1.

(First Stretching Step)

Next, using a uniaxially stretching apparatus, the aged homopolypropylene film was uniaxially stretched only in the extrusion direction at a strain rate indicated in Table 1 and a stretch ratio indicated in Table 1 such that the surface temperature thereof became a temperature indicated in Table 1.

(First Annealing Step)

Thereafter, the homopolypropylene film was supplied into a hot air furnace, and traveled for 1 minute while tension was not applied to the homopolypropylene film, such that the surface temperature of the homopolypropylene film became the temperature indicated in Table 1. In this manner, the homopolypropylene film was annealed to obtain a long-length separator for power storage devices. The thickness of the separator for power storage devices was 16 μm. It is noted that the shrinkage rate of the homopolypropylene film in the annealing step was a value indicated in Table 1.

Example 6

(Extrusion Step and Aging Step)

A homopolypropylene film was manufactured in the same manner as in Example 1.

(First Stretching Step)

Next, using a uniaxially stretching apparatus, the aged homopolypropylene film was uniaxially stretched only in the extrusion direction at a strain rate indicated in Table 1 and a stretch ratio indicated in Table 1 such that the surface temperature thereof became a temperature indicated in Table 1.

(First Annealing Step)

Thereafter, the homopolypropylene film was supplied into a hot air furnace, and traveled for 1 minute while tension was not applied to the homopolypropylene film, such that the surface temperature of the homopolypropylene film became the temperature indicated in Table 1. In this manner, the homopolypropylene film was annealed. The thickness of the homopolypropylene film was 17 μm. It is noted that the shrinkage rate of the homopolypropylene film in the first annealing step was a value indicated in Table 1.

(Second Stretching Step)

Next, using a uniaxially stretching apparatus, the homopolypropylene film having been subjected to the first annealing was uniaxially stretched only in the extrusion direction at a strain rate indicated in Table 1 and a stretch ratio indicated in Table 1 such that the surface temperature thereof became a temperature indicated in Table 1.

(Second Annealing Step)

Thereafter, the homopolypropylene film was supplied into a hot air furnace, and traveled for 1 minute while tension was not applied to the homopolypropylene film, such that the surface temperature of the homopolypropylene film became the temperature indicated in Table 1. In this manner, the homopolypropylene film was annealed to obtain a long-length synthetic resin microporous film. The thickness of the synthetic resin microporous film was 16 μm. It is noted that the shrinkage rate of the homopolypropylene film in the second annealing step was a value indicated in Table 1.

[Evaluation]

For the obtained synthetic resin microporous films, the air resistance, porosity, thickness, bubble point pore diameter rBP, average flow diameter rAVE, specific surface area, and maximum pore diameter were measured according to the above-described procedures. The results are shown in Table 1.

For the obtained separators for power storage devices, the value of a scattering vector q at which a first scattering peak appeared was measured by small-angle X-ray scattering measurement (SAXS). The values are shown in Table 1.

For the obtained separators for power storage devices, the lamellar long period was measured by small-angle X-ray scattering measurement (SAXS), and the results are shown in Table 1.

For the obtained separators for power storage devices, the DC resistance, breakdown voltage, dendrite resistance, thermal shrinkage rate, and electrolytic solution impregnability were measured according to the following procedures, and the results are shown in Table 1.

(DC Resistance)

A positive electrode and a negative electrode were prepared according to the following procedure to produce a small battery. The DC resistance of the obtained small battery was measured.

<Production Method of Positive Electrode>

In an Ishikawa grinding mortar, $Li_2CO_3$ and a coprecipitated hydroxide represented by $Ni_{0.5}Co_{0.2}Mn_{0.3}(OH)_2$ were mixed such that the molar ratio between Li and the whole transition metal became 1.08:1. Thereafter, the mixture was subjected to a heat treatment in the air atmosphere at 950° C. for 20 hours, and thereafter pulverized. Accordingly, $Li_{1.04}Ni_{0.5}Co_{0.2}Mn_{0.3}O_2$ having an average secondary particle diameter of about 12 μm was obtained as a positive electrode active material.

The positive electrode active material obtained as described above, acetylene black (HS-100 manufactured by Denki Kagaku Kogyo Kabushiki Kaisha) as a conductive auxiliary, and polyvinylidene fluoride (trade name "#7208" manufactured by Kureha Corporation) as a binder were mixed at a ratio of 91:4.5:4.5 (% by mass). This mixture was poured and mixed into N-methyl-2-pyrrolidone to produce a slurry solution. This slurry solution was applied onto an aluminum foil (manufactured by Toyo Tokai Aluminium Hanbai K.K., thickness: 20 μm) by a doctor blade method, and dried. The amount of the slurry solution applied was 1.6 g/cm³. The aluminum foil was pressed for cutting. Accordingly, a positive electrode was produced.

<Production Method of Negative Electrode>

Lithium titanate (trade name "XA-105" manufactured by Ishihara Sangyo Kaisha, Ltd., median diameter: 6.7 μm), acetylene black (trade name "HS-100" manufactured by Denki Kagaku Kogyo Kabushiki Kaisha) as a conductive auxiliary, and polyvinylidene fluoride (#7208 manufactured by Kureha Corporation) as a binder were mixed at a ratio of 90:2:8 (% by mass). This mixture was poured and mixed into N-methyl-2-pyrrolidone to produce a slurry solution. This slurry solution was applied onto an aluminum foil (manufactured by Toyo Tokai Aluminium Hanbai K.K., thickness: 20 μm) by a doctor blade method, and dried. The amount of the slurry solution applied was 2.0 g/cm³. The aluminum foil was pressed for cutting. Accordingly, a negative electrode was produced.

<Measurement of DC Resistance>

The positive electrode was punched into a circular shape having a diameter of 14 mm. The negative electrode was punched into a circular shape having a diameter of 15 mm. A small battery was constituted by impregnating the separator for power storage devices with an electrolytic solution while the separator for power storage devices was placed between the positive electrode and the negative electrode.

The electrolytic solution used was obtained by dissolving lithium hexafluorophosphate ($LiPF_6$) in a mixed solvent containing ethylene carbonate (EC) and diethyl carbonate (DEC) at a volume ratio of 3:7 to become a 1 M solution.

The small battery was charged at a current density of 0.20 mA/cm² to a previously determined upper limit voltage. The small battery was discharged at a current density of 0.20 mA/cm² to a previously determined lower limit voltage. The upper limit voltage was 2.7 V, and the lower limit voltage was 2.0 V. The discharge capacity obtained in the first cycle was defined as the initial capacity of the battery. Thereafter, the battery was charged to 30% of the initial capacity. Then, a voltage ($E_1$) when the battery was discharged at 60 mA ($I_1$) for 10 seconds and a voltage ($E_2$) when the battery was discharged at 144 mA ($I_2$) for 10 seconds were measured. The measured values were used to calculate a DC resistance value (Rx) at 30° C. according to the following formula.

$$Rx = |(E_1 - E_2)/\text{discharge current } (I_1 - I_2)|$$

(Breakdown Voltage)

The breakdown voltage of the separator for power storage devices was measured according to the following procedure using a breakdown tester (manufactured by Yamazaki Sangyo K.K., trade name "HAT-300-100RHO"). More specifically, a test piece having a regular square shape in a plane view with a side 100 mm was first cut out from the separator for power storage devices. The test piece was subjected to a static elimination treatment. An upper electrode (made of SUS) was brought into contact with a mark with a diameter of about 25 mm formed in the center of the upper surface of the test piece while a lower electrode (made of SUS) was brought into contact with the lower surface of the test piece to measure a breakdown voltage. The measurement was performed under conditions where an atmospheric medium was air, a test temperature was 25° C., a relative humidity was 50%, and a temperature rise rate was 100 V/sec. Three test pieces were prepared, and an arithmetic mean value of breakdown voltages of the test pieces was defined as the breakdown voltage of the separator for power storage devices.

(Dendrite Resistance)

After a positive electrode and a negative electrode were prepared according to the following condition, a small battery was produced. The dendrite resistance of the obtained small battery was evaluated.

<Production Method of Positive Electrode>

In an Ishikawa grinding mortar, $Li_2CO_3$ and a coprecipitated hydroxide represented by $Ni_{0.33}Co_{0.33}Mn_{0.33}(OH)_2$ were mixed such that the molar ratio between Li and the whole transition metal became 1.08:1. Thereafter, the mixture was subjected to a heat treatment in the air atmosphere at 950° C. for 20 hours, and thereafter pulverized. Accordingly, $Li_{1.04}Ni_{0.33}Co_{0.33}Mn_{0.33}O_2$ having an average secondary particle diameter of about 12 μm was obtained.

The positive electrode active material obtained as described above, acetylene black (trade name "HS-100" manufactured by Denki Kagaku Kogyo Kabushiki Kaisha) as a conductive auxiliary, and polyvinylidene fluoride (trade name "#7208" manufactured by Kureha Corporation) as a binder were mixed at a ratio of 92:4:4 (% by mass). This mixture was poured and mixed into N-methyl-2-pyrrolidone to produce a slurry solution. This slurry solution was applied onto an aluminum foil (manufactured by Toyo Tokai Aluminium Hanbai K.K., thickness: 15 μm) by a doctor blade method, and dried. The amount of the slurry solution applied was 2.9 g/cm$^3$. Thereafter, the aluminum foil was pressed to produce a positive electrode.

<Production Method of Negative Electrode>

Natural graphite (average particle diameter 10 μm) as a negative electrode active material, acetylene black (HS-100 manufactured by Denki Kagaku Kogyo Kabushiki Kaisha) as a conductive auxiliary, and polyvinylidene fluoride (trade name "#7208" manufactured by Kureha Corporation) as a binder were mixed at a ratio of 95.7:0.5:3.8 (% by mass) to produce a mixture. This mixture was poured and mixed into N-methyl-2-pyrrolidone to produce a slurry solution. This slurry solution was applied onto a rolled copper foil (manufactured by Nippon Foil Mfg. Co., Ltd., thickness 10 μm) by a doctor blade method, and dried. The amount of the slurry solution applied was 1.5 g/cm$^3$. Thereafter, the rolled copper foil was pressed to produce a negative electrode.

<Measurement of Dendrite Resistance>

The positive electrode was punched out into a circular shape having a diameter of 14 mm and the negative electrode was punched out into a circular shape having a diameter of 15 mm to prepare electrodes. A small battery was constituted by placing the separator for power storage devices between the positive electrode and the negative electrode and adding an electrolyte solution to the separator for power storage devices. It is noted that the used electrolytic solution was obtained by dissolving lithium hexafluorophosphate ($LiPF_6$) in a mixed solvent containing ethylene carbonate (EC) and diethyl carbonate (DEC) at a volume ratio of 3:7 to become a 1 M solution. The small battery was charged at a current density of 0.2 mA/cm$^2$ to a previously determined upper limit voltage of 4.6 V. The small battery was placed in a blast oven at 60° C., and the voltage change was observed for 6 months. After the lapse of 6 months, it was confirmed whether a short circuit between the positive electrode and the negative electrode occurred in the small battery.

For three small batteries, a determination was made as to whether or not a short circuit between the positive electrode and the negative electrode had occurred according to the above-described procedure, and an evaluation was made on the basis of the number of batteries in which a short circuit occurred.

A . . . The number of batteries in which a short circuit had occurred was 0.

B . . . The number of batteries in which a short circuit had occurred was 1.

C . . . The number of batteries in which a short circuit had occurred was 2 or 3.

(Thermal Shrinkage Rate)

A test piece having a regular square shape in a plane view with a side 12 cm was cut out from the separator for power storage devices at 23° C. Any one of the edges of the test piece was adjusted to correspond to the extrusion direction (MD). Straight lines L and L each having a length of 10 cm were drawn in the center of the test piece so as to be orthogonal to each other. The straight lines L and L were adjusted to be parallel to the edges of the test piece. The test piece was inserted between two plates of float glass each having a regular square shape in a plane view with a side 15 cm and a thickness of 2 mm to smooth out wrinkles of the test piece. In such a state, the length of each of the straight lines L and L drawn on the test piece was read at 23° C. to $\frac{1}{10}$ of a micrometer using a two-dimensional length measuring machine (CW 2515N manufactured by Chien Wei Precise Technology Co., Ltd.). An arithmetic mean value of lengths of the two straight lines L and L was defined as the initial length $L_0$ of the straight line L. Then, the test piece was removed from between the float glass plates. The test piece was placed in a thermostatic chamber (manufactured by AS ONE Corporation, trade name "OF-450B") set at 105° C., allowed to stand for 1 hour, and then removed. The test piece was inserted between two plates of float glass each having a regular square shape in a plane view with a side 15 cm and a thickness of 2 mm to smooth out wrinkles of the test piece. In such a state, the length of each of the straight lines L and L drawn on the test piece was read at 23° C. to $\frac{1}{10}$ of a micrometer using a two-dimensional length measuring machine (CW 2515N manufactured by Chien Wei Precise Technology Co., Ltd.). An arithmetic mean value of lengths of the two straight lines L and L was defined as the length after heating $L_1$ of the straight line L. According to the following formula, a thermal shrinkage rate was calculated.

$$\text{Thermal shrinkage rate (\%)} = 100 \times (\text{initial length } L_0 - \text{length after heating } L_1)/\text{initial length } L_0$$

(Electrolytic Solution Impregnability)

A white sheet of paper (manufactured by KOKUYO Co., Ltd., trade name "KB paper KB-39N") was put on a smooth glass plate horizontally placed, and the separator for power storage devices was superimposed onto the white sheet of paper. Then, 100 μL of an electrolytic solution was dropped onto the upper surface of the separator for power storage devices using a micropipette so as to spread in a rough circle. The electrolytic solution used was one commercially available from Tomiyama Pure Chemical Industries, Ltd. under the trade name of "LIPASTE-3E7MEC/PF1" (composition: EC (ethylene carbonate):MEC (methyl ethyl carbonate)=3:7 (volume ratio)/$LiPF_6$ (lithium hexafluorophosphate) 1.0 M). After the electrolytic solution was dropped onto the upper surface of the separator for power storage devices, the time until a stain of the electrolytic solution seeping through the separator for power storage devices into the white sheet of paper had the same size (area) as the electrolytic solution spreading over the upper surface of the separator for power storage devices was measured and defined as electrolytic solution impregnation time.

TABLE 1

| | | Examples | | | | | | Comparative Examples | |
|---|---|---|---|---|---|---|---|---|---|
| | | 1 | 2 | 3 | 4 | 5 | 6 | 1 | 2 |
| Homopolypropylene | Weight-Average Molecular Weight Mw | 413,000 | 413,000 | 413,000 | 413,000 | 413,000 | 413,000 | 413,000 | 413,000 |
| | Number-Average Molecular Weight Mn | 44,300 | 44,300 | 44,300 | 44,300 | 44,300 | 44,300 | 44,300 | 44,300 |
| | Molecular Weight Distribution (Mw/Mn) | 9.3 | 9.3 | 9.3 | 9.3 | 9.3 | 9.3 | 9.3 | 9.3 |
| | Melting Point (° C.) | 163 | 163 | 163 | 163 | 163 | 163 | 163 | 163 |
| Extrusion Step | Resin Temperature (° C.) | 220 | 220 | 220 | 220 | 220 | 220 | 220 | 220 |
| | Film Forming Rate (m/min) | 22 | 22 | 22 | 22 | 22 | 22 | 22 | 18 |
| | Extrusion Amount (kg/hr) | 12 | 12 | 12 | 12 | 12 | 12 | 12 | 12 |
| | Draw Ratio | 70 | 70 | 70 | 70 | 70 | 70 | 70 | 55 |
| Aging Step | Aging Temperature (° C.) | 147 | 147 | 147 | 147 | 147 | 147 | 147 | 148 |
| | Aging Time (min) | 10 | 10 | 10 | 10 | 10 | 10 | 12 | 12 |
| First Stretching Step | Surface Temperature (° C.) | 140 | 140 | 140 | 140 | 140 | 140 | 140 | 140 |
| | Stretch Ratio (times) | 2.5 | 2.2 | 2.7 | 2.5 | 2.7 | 1.6 | 3.2 | 2.7 |
| | Strain Rate (%/min) | 40 | 45 | 122 | 110 | 45 | 70 | 209 | 260 |
| First Annealing Step | Surface Temperature (° C) | 130 | 130 | 130 | 130 | 130 | 130 | 130 | 130 |
| | Shrinkage Rate (%) | 10 | 14 | 14 | 14 | 10 | 7 | 10 | 14 |
| Second Stretching Step | Surface Temperature (° C.) | — | — | — | — | — | 140 | — | — |
| | Stretch Ratio (times) | — | — | — | — | — | 1.7 | — | — |
| | Strain Rate (%/min) | — | — | — | — | — | 35 | — | — |
| Second Annealing Step | Surface Temperature (° C.) | — | — | — | — | — | 130 | — | — |
| | Shrinkage Rate (%) | — | — | — | — | — | 7 | — | — |
| Separator For Power Storage Device | Air Resistance (sec/100 mL/16 μm) | 35 | 78 | 55 | 58 | 32 | 52 | 96 | 124 |
| | Porosity (%) | 58 | 45 | 57 | 55 | 60 | 55 | 61 | 53 |
| | Thickness (μm) | 16 | 16 | 16 | 16 | 16 | 16 | 16 | 16 |
| | Scattering Vector q ($nm^{-1}$) | 0.0038 | 0.0071 | 0.0056 | 0.0064 | — | — | 0.0124 | 0.0115 |
| | Lamellar Long Period (nm) | 25.0 | — | 24.6 | 24.1 | 24.6 | — | 28.1 | 24.6 |
| | Bubble Point Pore Diameter rBP (μm) | 0.063 | 0.049 | 0.064 | 0.063 | — | 0.035 | 0.049 | 0.051 |
| | Average Flow Diameter rAVE (μm) | 0.063 | 0.048 | 0.048 | 0.048 | — | 0.032 | 0.034 | 0.036 |
| | 100 × (rBP − rAVE)/rAVE | 0 | 2 | 34 | 32 | — | 9 | 44 | 42 |
| | Specific Surface Area ($m^2/g$) | 27.0 | — | 42.0 | 51.0 | 25.4 | — | 79.0 | 45.0 |
| | Maximum Pore Diameter (μm) | 0.38 | — | 0.27 | 0.26 | 0.39 | — | 0.29 | 0.14 |
| Evaluation | DC Resistance (Ω) | 1.62 | 1.75 | 1.72 | 1.73 | | | | |
| | Breakdown Voltage (kv) | 1.1 | 1.5 | 1.2 | 1.3 | | | | |
| | Dendrite Resistance | B | A | A | A | | | | |
| | Thermal Shrinkage Rate (%) | 1.8 | — | 2.8 | 2.6 | | | | |
| | Electrolytic Solution Impregnation Time (sec) | 13 | — | 15 | 16 | | | | |

TABLE 1-continued

| Evaluation | DC Resistance (Ω) | 1.59 | 1.70 | 1.82 | 1.85 |
|---|---|---|---|---|---|
| | Breakdown Voltage (kv) | — | 1.4 | 1.5 | 1.4 |
| | Dendrite Resistance | — | A | C | A |
| | Thermal Shrinkage Rate (%) | 2.0 | — | 4.0 | 3.7 |
| | Electrolytic Solution Impregnation Time (sec) | 13 | — | 112 | 125 |

INDUSTRIAL APPLICABILITY

The separator for power storage devices of the present invention has excellent permeability of ions such as lithium ions, sodium ions, calcium ions, and magnesium ions, and can substantially, effectively suppress the generation of a dendrite. Therefore, the separator for power storage devices is suitably used as a separator for power storage devices.

The invention claimed is:

1. A separator for a power storage device, the separator comprising:
    a synthetic resin film having minute pore portions,
    wherein the separator has:
    an air resistance of 30 sec/100 mL/16 μm or more and 100 sec/100 mL/16 μm or less;
    a first scattering peak in a stretching direction measured by small-angle X-ray scattering measurement (SAXS) present in a range where a scattering vector is 0.0030 nm$^{-1}$ or more and 0.0080 nm$^{-1}$ or less; and
    a lamellar long period measured by SAXS of 25 nm or less.

2. The separator according to claim 1, wherein the separator is uniaxially stretched, and has a bubble point pore diameter rBP and an average flow diameter rAVE measured by a bubble point method, the bubble point pore diameter rBP and the average flow diameter rAVE satisfying:

$$100\times(rBP-rAVE)/rAVE<40.$$

3. The separator according to claim 1, wherein the separator has a porosity of 45% or more and 65% or less, and a specific surface area of 20 m$^2$/g or more and 60 m$^2$/g or less.

4. The separator according to claim 1, wherein the synthetic resin film includes an olefin-based resin.

5. The separator according to claim 4, wherein the olefin-based resin has a weight-average molecular weight of 30,000 or more and 500,000 or less and a melting point of 130° C. or higher and 170° C. or lower.

6. The separator according to claim 1, wherein the separator is uniaxially stretched.

7. A power storage device comprising the separator according to claim 1.

* * * * *